United States Patent [19]

Heitmann

[11] Patent Number: 5,021,895
[45] Date of Patent: Jun. 4, 1991

[54] METHOD AND MAGNETIC HEAD FOR RECORDING SIGNALS MAGNETICALLY

[75] Inventor: Jürgen Heitmann, Alsbach-Hähnlein, Fed. Rep. of Germany

[73] Assignee: BTS Broadcast Television Systems GmbH, Darmstadt, Fed. Rep. of Germany

[21] Appl. No.: 444,723

[22] Filed: Dec. 1, 1989

[30] Foreign Application Priority Data

Dec. 14, 1988 [DE] Fed. Rep. of Germany ....... 3842079

[51] Int. Cl.⁵ .............................................. G11B 5/03
[52] U.S. Cl. ...................................... 360/66; 360/21; 360/118; 360/121
[58] Field of Search ...................... 360/66, 21, 68, 119, 360/121, 118

[56] References Cited

U.S. PATENT DOCUMENTS

| | | | |
|---|---|---|---|
| 4,607,293 | 8/1986 | Okada et al. | 360/21 |
| 4,646,169 | 2/1987 | Shimpuku | 360/21 |
| 4,945,438 | 7/1990 | Matsumoto et al. | 360/21 |

Primary Examiner—Vincent P. Canney
Attorney, Agent, or Firm—Frishauf, Holtz, Goodman & Woodward

[57] ABSTRACT

A method of recording signals on a magnetic medium, in which a first magnetic head (1) blanks a wide track by recording signals at a first azimuth angle and a second magnetic head (2) records a narrower signal track (15) by recording signals at a second, differing azimuth angle. This permits feeding the same current or signal through the head windings (8,9) of both heads, thereby economizing on driving circuitry (10). Due to the differing azimuth angles, the reading head does not pick up any significant amount of noise from the border regions defined between the edges of the signal track and the wider blanking track. The width of the signal track and the widths of the border regions sum to equal the width of the blanking track.

5 Claims, 1 Drawing Sheet

METHOD AND MAGNETIC HEAD FOR RECORDING SIGNALS MAGNETICALLY

The present invention relates generally to the recording of signals on a magnetic carrier, and, more particularly to a method in which a first magnetic head erases a track at a first azimuth angle and a second magnetic head records at a second azimuth angle.

BACKGROUND

German Published Examined Application DE-AS 12 96 199 of 19 May 1969, DICKINSON/IBM DEUTSCHLAND, discloses an apparatus for recording/retrieval of data by means of a magnetic head device which can be adjusted to arbitrarily selected tracks of a magnetic disk memory. As shown in FIG. 2, the magnetic head device has a working gap 15 for erasure of data, which gap is arranged, with reference to the tracking direction, ahead of an working gap 17 for the recording or retrieval of data. The track width of the working gap 15 for the erasure of data is greater than the track width of the working gap 17 for the recording/retrieval of data. The exciter winding of the gap for the erasure of data is selectively connectable, at a branchpoint, via one of two connecting leads, to a current source. The winding is connected in series with a rectifier and in parallel with a capacitor. This known apparatus erases using rectified current, with the result that phase distortions are apparent in the signal played back. These phase distortions are of the non-linear sort, and cannot be suppressed by using a linear equalizer.

Further European Published Application EP 0 280 326 A2, OKAMURA/TOSHIBA, discloses a magnetic head device consisting of a read/write system and two erasure systems limiting the width of the recorded track. The erasure systems, arranged downstream, in the direction of motion of the recording medium, from the read/write system, trim the previously accomplished recorded track, according to the so-called "tunnel-erasure" method, down to a predetermined useful track width.

As disclosed in European Published Application EP 0 170 004 A1, KUMASAKA/HITACHI, the two erasure systems are generally combined into a so-called tunnel-erase head, so that both erasure systems can be simultaneously controlled with a single head winding. However, since the erasure systems are separated, signal-wise, from the read/write systems, such a magnetic head arrangement requires a greater circuitry investment for generation and control of the recording and erasure signals.

THE INVENTION

Accordingly, it is a primary object of the present invention to provide a method of using separate erase and read/write heads, in which the track intended to be used for recording can be erased in a simple manner.

Briefly, this is accomplished by running the same current through both heads but arranging them at different azimuth angles.

The method of the present invention has the advantage that the leading magnetic head performs an alternating current erasure of the recorded track, without requiring a special erasure signal from an erasure generator. This avoids the need for special controls for switching the erasure function on and off.

It is particularly advantageous to use a leading magnetic head with a track width greater than that of the recording head to created a blanked or cleared region flanking the recorded track. This improves the interval between defects in the reproduced signal.

DRAWINGS

DETAILED DESCRIPTION

Figure 1:
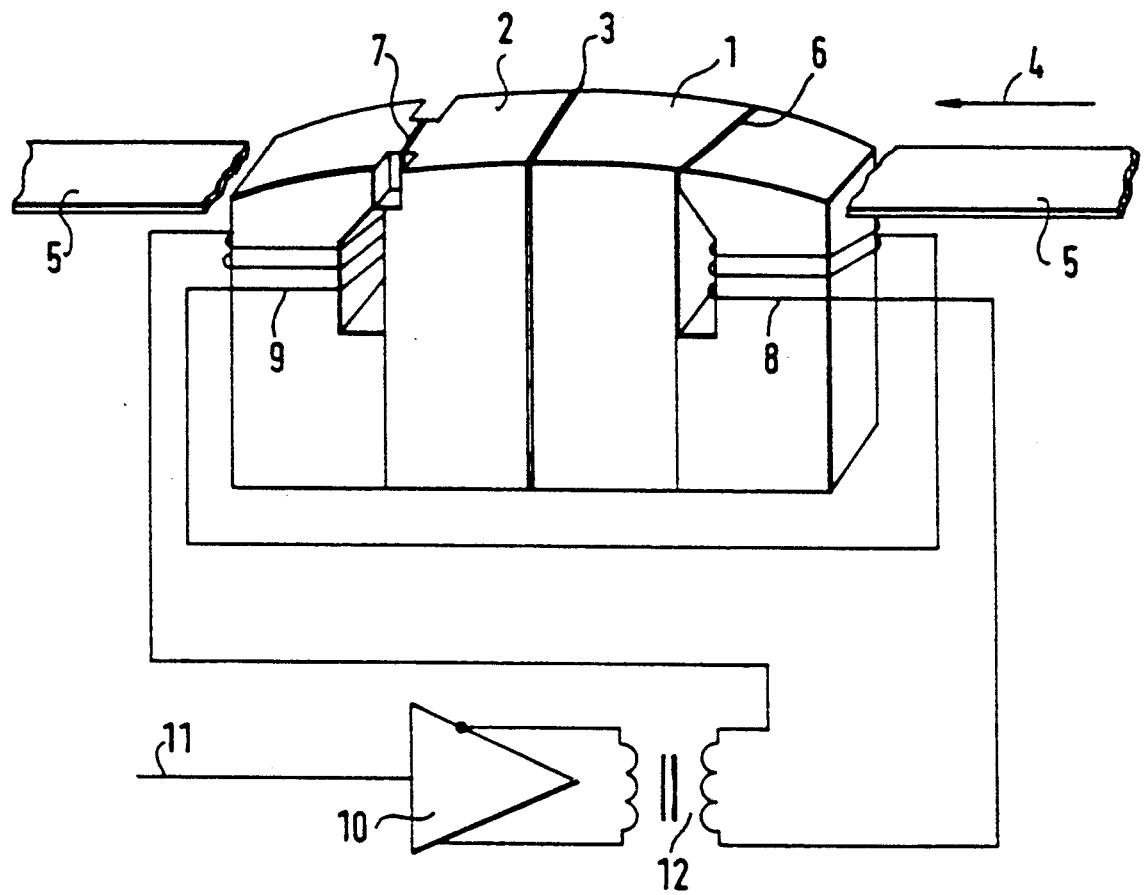
FIG. 1 is a schematic view of the magnetic head configuration of the present invention.

FIG. 1 shows a magnetic head configuration having a leading magnetic head 1 and a trailing or following magnetic head 2. Respective side faces of heads 1 and 2 are glued together at 3 to form a combination head. It is of course understood that such a combination head is arranged on the circumference of a rotatable body (not shown) of a rotating reading device, as is well known in the oblique-track recording art. Such rotating reading devices are generally helically encircled by a magnetic tape, so that tracks oblique to the tape edge are recorded on the tape.

Arrow 4 in FIG. 1 indicates the direction of motion of magnetic tape 5. Tape 5 feeds first over a gap 6 of leading magnetic head 1 and then over a gap 7 of recording head 2. A head winding 8 of leading magnetic head 1 and a head winding 9 of recording head 2 are connected in series. A recording current generated by a recording amplifier 10 flows through both head windings 8 and 9. Recording amplifier 10 is controlled by a recording signal on its input line 11. Between recording amplifier 10 and the combination head formed by heads 1 and 2, there is interposed a transformer 12. Transformer 12 constitutes the rotating scanning element of the aforementioned rotating reading device.

Figure 2:
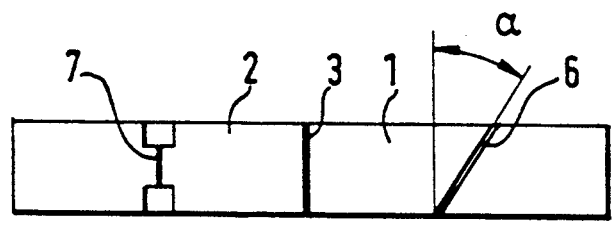
FIG. 2 is a plan view of the polished head surface of the magnetic head configuration thereof.

FIG. 2 illustrates the polished head surface as a plan view of the combination magnetic head formed by magnetic heads 1 & 2. In this figure, corresponding elements are designated with the same reference numerals. Gap 7 of magnetic recording head 2 has a greater track width than gap 6 of magnetic erasure head 1. Further, gap 6 is distinguished from gap 7 by having a different azimuth angle α.

Figure 3:
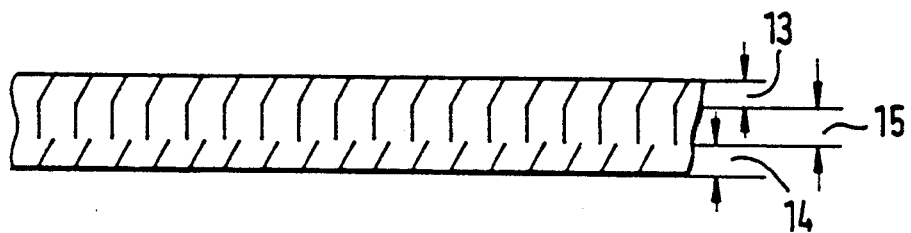
FIG. 3 illustrates a section of the recorded track.

The magnetic head configuration of the invention records the signals coming in on line 11 as a sequence of parallel oblique tracks on magnetic tape 5. A section of one of these oblique tracks is illustrated in FIG. 3. The track section has a magnetization structure which corresponds to the azimuth angles of both gaps 6 and 7. The magnetization structures in the cleared regions 13 and 14 correspond to the azimuth angle α of gap 6 of leading magnetic head 1. The thus-recorded "erasure track" is subsequently partly over-written by gap 7 of magnetic recording head 2. Central region 15 in the longitudinal direction of the track shown reproduces the azimuth orientation of gap 7.

During reproduction or playback, a reading head (not shown) reads back the recorded track on magnetic tape 5. Due to mechanical deficiencies, particularly tolerances in tracking accuracy, a magnetic reading head can deviate from the recorded track 15 in the direction of cleared regions 13 and 14. Depending upon the deviation from track, the signal/noise ratio in the reproduced signal varies. If cleared regions 13 and 14 were to have signals recorded with the same azimuth angles as those of useful track region 15, the signal/noise ratio would degrade in proportion to the deviation from track. Due to the difference in azimuth angles between the magnetic heads 1 and 2, the signal/noise ratio during playback no longer degrades linearly. Depending upon the azimuth angle α, the signal/noise ratio in the reproduced signal can be so increased that the signal components recorded in blanked regions 13 and 14 are no problem.

What is claimed is:

1. A method of recording signals on a magnetic carrier, in which a leading magnetic head (1) erases a track ahead of a following magnetic recording head (2), wherein, in accordance with the invention, said leading magnetic head (1) erases its track by means of a current through its head winding (8) which current also flows through a head winding (9) of said magnetic recording head (2), said recording head (2) overwriting said erased track (13, 14) by recording signals (15) at a different azimuth angle than said leading magnetic head (1).

2. A method according to claim 1, further comprising recording signals as a sequence of parallel tracks with blanked regions (13, 14) therebetween by first recording, using said leading magnetic head (1), a blanking track, and thereafter recording, using said recording head (2), a signal track (15), the width of said blanking track corresponding to the sum of the width of said signal track and the widths of said blanked regions (13, 14).

3. Magnetic head configuration for carrying out the method of claim 1, comprising a magnetic recording head (2) with a predetermined azimuth angle, a leading magnetic head (1) located upstream, with respect to passage of recording medium, of said recording head (2) and having an azimuth angle deviating from that of said recording head, and a pair of head windings (8, 9) connected in series, and each located on a respective one of said magnetic heads (1, 2).

4. Magnetic head configuration according to claim 3, wherein said magnetic recording head (2) and said leading magnetic head (1) are connected together to define a combination head and are mounted on the circumference of a rotatable element of a rotating reading device.

5. Magnetic head configuration according to claim 3, further comprising a recording amplifier (10) generating an output signal which is applied to said series-connected head windings (8, 9).

* * * * *